(No Model.)
P. H. JACKSON.
FLOOR AND SIDEWALK CONSTRUCTION.
No. 320,066.  Patented June 16, 1885.
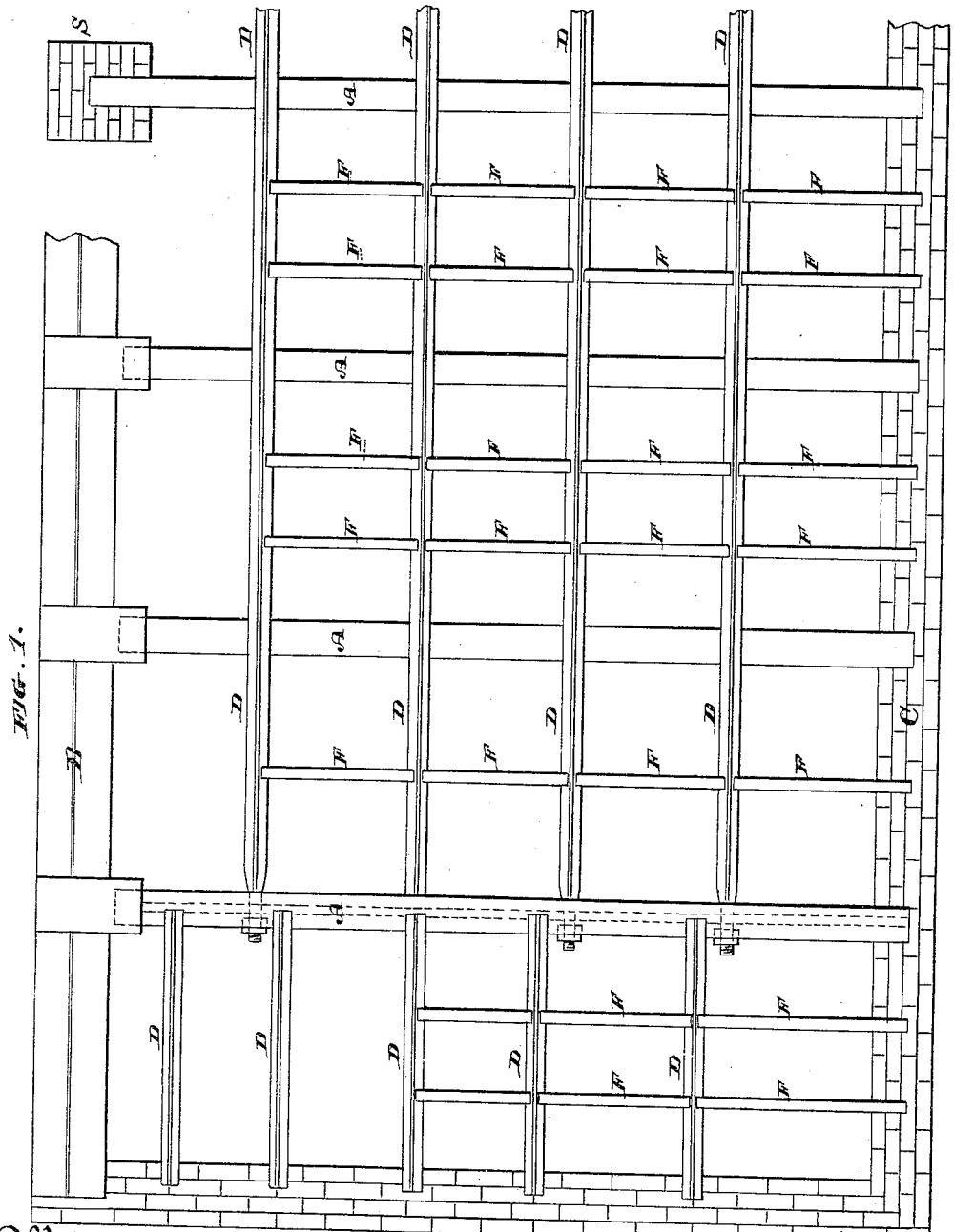
Witnesses,
Geo. H. Strong.
J. H. Nourse.
Inventor,
P. H. Jackson
By Dewey & Co
Attorneys

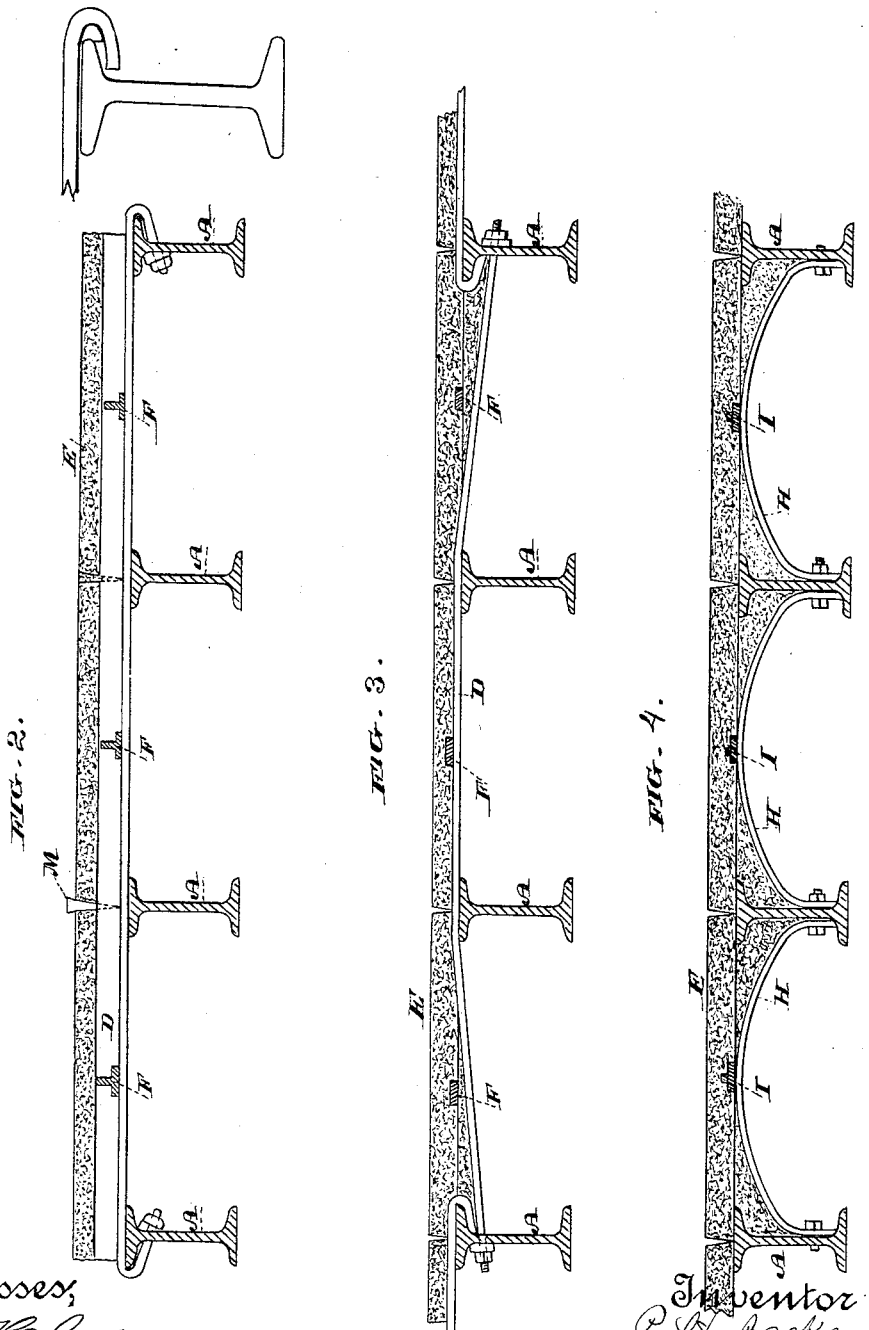

(No Model.)  7 Sheets—Sheet 3.
P. H. JACKSON.
FLOOR AND SIDEWALK CONSTRUCTION.
No. 320,066.  Patented June 16, 1885.
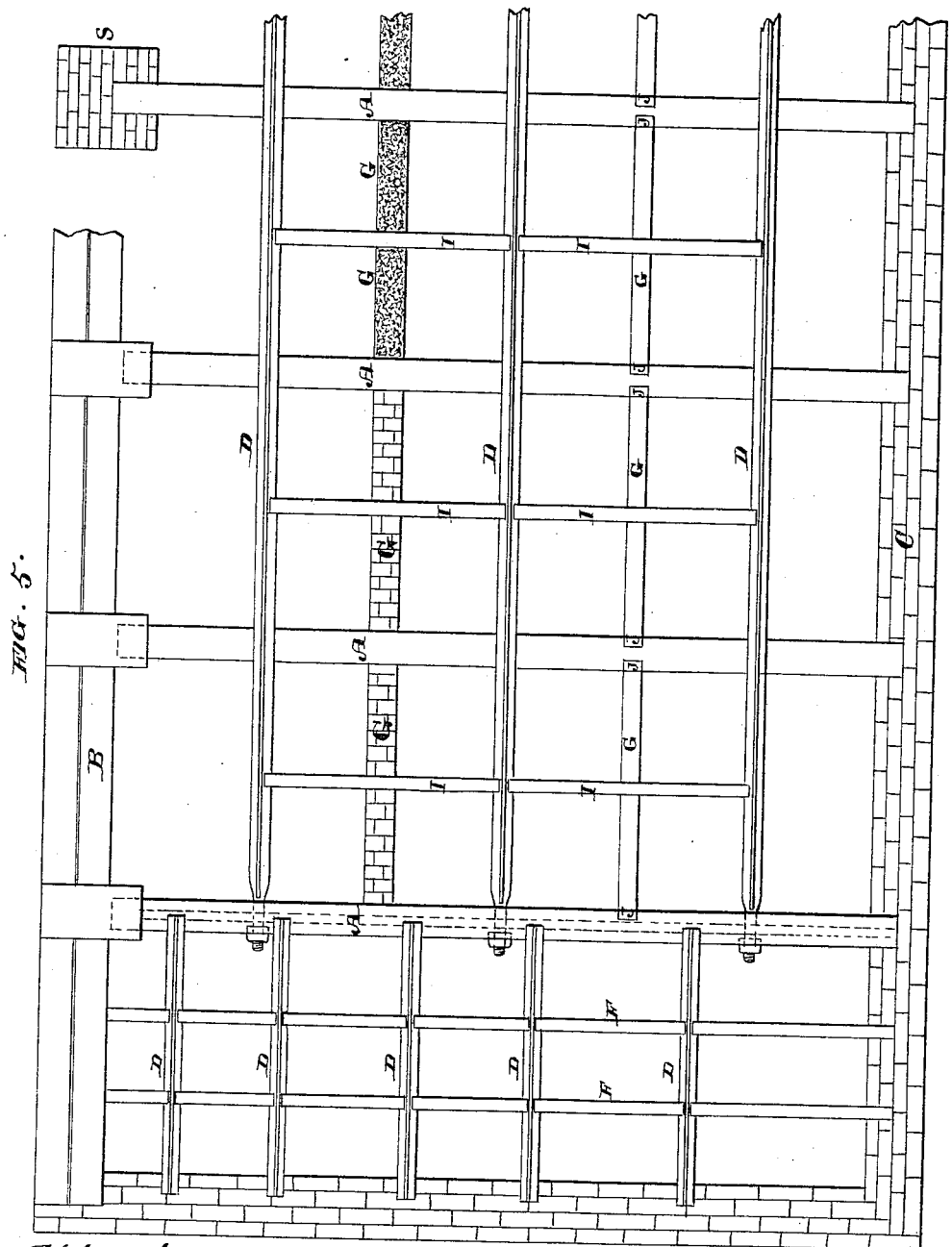

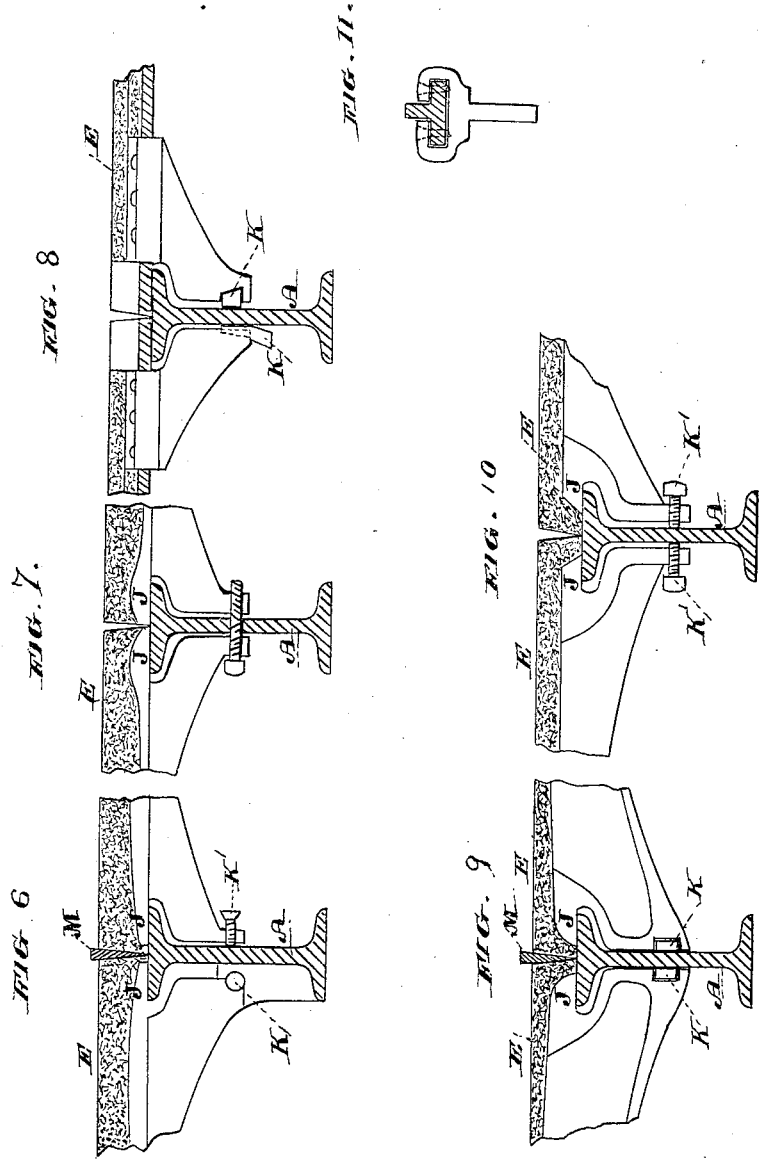

(No Model.) 7 Sheets—Sheet 5.
P. H. JACKSON.
FLOOR AND SIDEWALK CONSTRUCTION.
No. 320,066. Patented June 16, 1885.
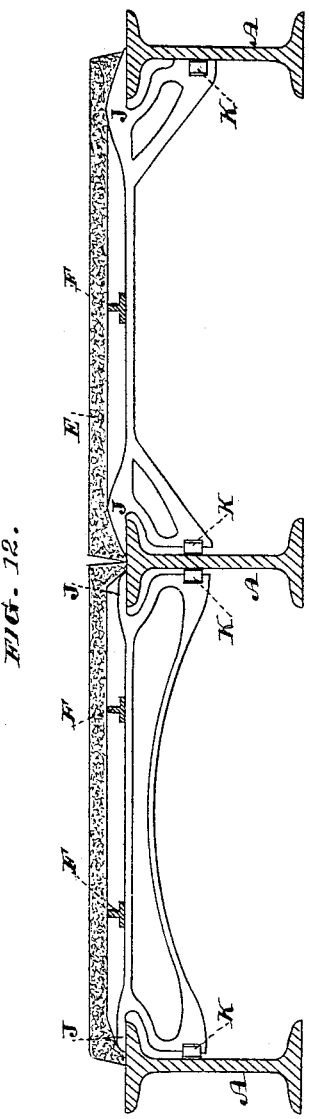
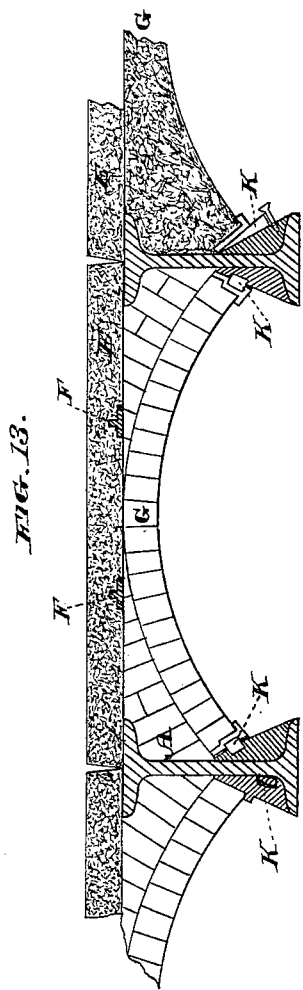
Witnesses,
Geo. H. Strong.
J. H. Nourse.
Inventor,
P. H. Jackson
By Dewey & Co.
Attorneys.

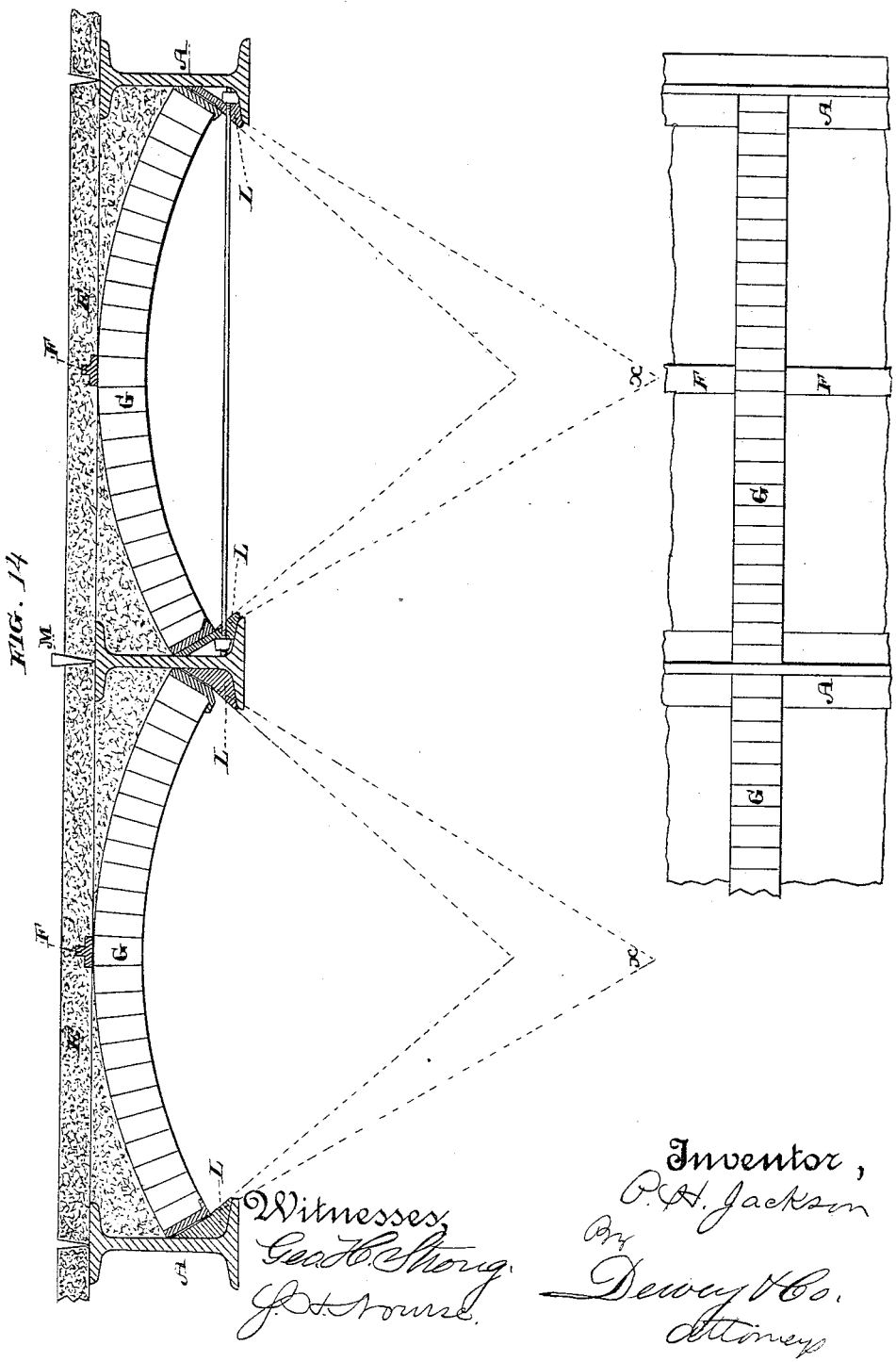

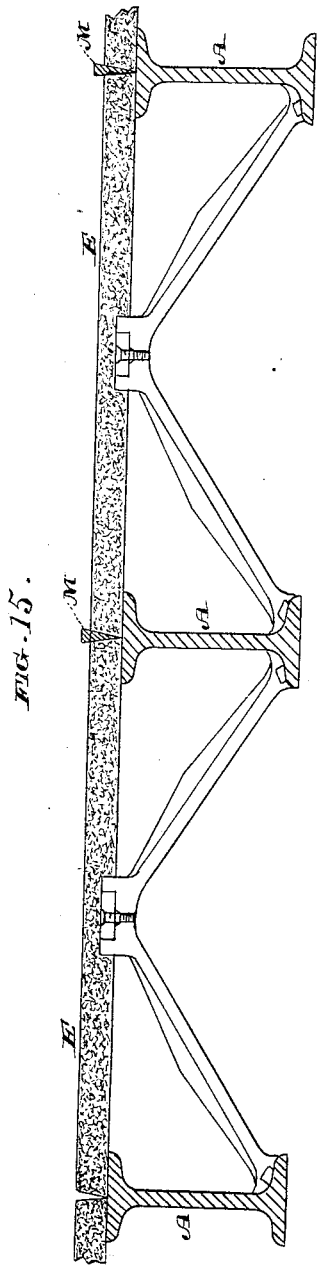

UNITED STATES PATENT OFFICE.

PETER H. JACKSON, OF SAN FRANCISCO, CALIFORNIA.

FLOOR AND SIDEWALK CONSTRUCTION.

SPECIFICATION forming part of Letters Patent No. 320,066, dated June 16, 1885.

Application filed December 10, 1883. Renewed December 2, 1884. (No model.)

*To all whom it may concern:*

Be it known that I, PETER H. JACKSON, of the city and county of San Francisco, and State of California, have invented an Improvement in Floor and Sidewalk Construction; and I hereby declare the following to be a full, clear, and exact description thereof.

My invention relates to certain improvements in floor and sidewalk construction; and it consists in a novel combination and arrangement of parts, together with certain details of construction, all of which will be more fully explained by reference to the accompanying drawings, in which—

Figure 1 is a plan of an area showing my construction. Figs. 2, 3, and 4 are sections of the bearers and bars. Fig. 5 is a plan of the area showing my construction of arches. Figs. 6 to 15, both inclusive, show details of construction.

In the construction of basement-extensions it is important to obtain all the head-room possible, and for this purpose, when on account of water or other reasons it is not feasible to dig deep, expensive iron sidewalks are used to avoid the deep brick or concrete arches which would otherwise have to be built, and which would be so low as to greatly interfere with the usefulness of the space beneath.

In my invention the vault-beams A extend across above the space or basement-extension, their inner ends being supported by the girder at B or the basement-piers S, while their outer ends rest upon the brick wall at C. Across the spaces between these beams at intervals short transverse beams are laid, of suitable form for the greatest strength, to support the superincumbent pavement; or I may use light metallic arches or small sectional concrete or brick arches at intervals, connected by light iron bars on top, all resting upon the vault-beams A.

By my construction I dispense with the usual continuous brick or concrete arches which support sidewalks, and gain the room which they take up in height, the sidewalk being of the usual thickness. The vault-beams may also be made lighter and at less cost, there being no heavy continuous brick or concrete arches to be sustained by them, and which from their depth would occupy space which in my construction is made available.

The ends of the beams A are in any method of fastening secured against side movement, and the wrought or cast iron bars D are laid across them, as shown in Fig. 1, at such distances apart as to support the sidewalk or floor. These bars are preferably of a $\perp$-form; and the sidewalk E, which is of concrete, is supported upon the flanges, so that its lower surface is flush with the bottoms of the bars. In some cases these bars or bearers may be placed farther apart, and short cross bars F may be laid between them. In some cases these transverse bars may have their ends secured to the outer beams, so as to act as tie-bars, as shown in Figs. 2 and 3. In Fig. 2 the ends are bent over in the form of a hook, and wedge-shaped keys may be driven in between the curved portion and the beam to produce the proper tension, or screws may be employed for the same purpose. In Fig. 3 the ends of the bars are made round, to pass through the web of the beam just beneath its top flange, and the proper tension is produced by a nut, the end being screw-threaded to receive it. The concrete or other sidewalk being then formed upon them adheres to them, and they become an integral part of it.

As the beams to which the tie-bars are secured are comparatively weak, to resist the lateral strain occasioned by the tension of the bars, I interpose alternate light sectional metallic, concrete, or brick arches G, which resist the tensile strain of the tie-rods. (See Fig. 5.) I may also employ light metallic or other sectional arches H, extending between the beams, to which they are bolted on opposite sides, in which case light bars I extend along the crown of the arch, as shown in Fig. 4.

When sectional metallic, brick, or concrete arches are used extending between the beams at intervals, they may be fitted and given the proper resistance to compression in the following manner: If metallic arches are used, they have projections J, which hook over the tops of the beams, while the ends are of sufficient depth to stand opposite to and approach nearly to the web of the beam at some point in its depth, as shown in Figs. 6, 7, 8, 9, 10, and 12.

In order to produce the required compression of the lower part of the arch, keys K may be driven in between its lower ends and the side of the beam, so as to press these lower ends of the arch toward each other, and resist any tendency of the arch to sink in the center. It will be manifest, also, that screws K' may be employed in the place of wedges, and the same results produced. Figs. 6, 7, 8, 9, 10, 11, 12 show this construction, and Fig. 13 shows a similar use of keys or screws when brick or concrete arches are employed instead of metallic ones.

It will be seen that the abutting ends of the arches will stand in radial lines having a center, which may be represented by X, as shown in Fig. 14, which also shows a plan of the arch. Between these ends and the beam I introduce beveled blocks L, the upper part of which may have inclined faces of the same radius, against which the ends of the beams abut. These faces are curved toward the bottom, so that the lower part of these faces have a radius shorter than the upper portion. If, therefore, the arch sinks by reason of great weight upon it, it is allowed to slide a short distance down these inclines until it reaches that portion which, by reason of its shorter radius, tends to compress the lower ends of the arch toward each other, thus producing a similar strengthening effect with the keys or screws, before described.

Sectional metallic arches constructed as shown may also be made with the keys, wedges, or screws to relieve them from the tensile strain in the center when a heavy load is placed upon them.

Fig. 15 shows metallic braces which are equivalent to the arches.

After these supports are in place the sidewalk is formed as follows: First, between the beams and on the bottom surface of the ties or supporting-ribs are laid wooden or other forms. Then the Portland-cement concrete is thrown on top and rammed in the ordinary manner until the usual or desired thickness for the sidewalk is produced. Over each vault-beam in one direction and the ties or bars in the other are set V-shaped pieces of wood or metal M, forming a channel or separation between the slabs, and when the material has set and become of sufficient hardness the strips are withdrawn, and the channels filled with fusible or plastic cement to prevent leakage. The tops of the beams and bars form a base to prevent the fusible or plastic cement from running through before it sets.

Having thus described my invention, what I claim as new, and desire to secure by Letters Patent, is—

1. In a sidewalk or floor, metallic beams and independent transverse bearers, in combination with artificial stone, concrete, or similar blocks formed in sections, with channels between filled with fusible or plastic cement, substantially as herein described.

2. In a sidewalk or floor, metallic beams and transverse bearers supporting a surface of artificial stone or concrete, said bearers being tensilely strained to act both as bearers and ties, substantially as herein described.

3. In a sidewalk or floor, metallic beams and transverse bearers, in combination with sectional brick or metallic arches alternating, substantially as herein described.

4. In a sidewalk or floor, metallic beams and transverse bearers, with secondary bearers resting upon them, supporting a surface of artificial stone or concrete, said bearers being tensilely strained to act both as bearers and ties, substantially as herein described.

5. In a sidewalk or floor, metallic beams with independent transverse arches or bearers, in combination with wedge-keys or screws, whereby resistance to compression may be applied and adjustment made, substantially as herein described.

6. In a sidewalk or floor, metallic beams, in combination with transverse bearers tensilely strained to act as ties, and alternate brick, concrete, or metal arches or braces, with means for applying a thrust or resistance to compression, substantially as herein described.

7. In a sidewalk or floor, metallic beams with transverse bearers and alternate arches, acting tensilely and compressively, as shown, in combination with a floor or surface of artificial stone or concrete supported upon the fabric, substantially as herein described.

8. In a sidewalk or floor, metallic beams with transverse metallic arches or brackets having hooks or bearings at the top to rest upon the projecting flanges, beams, and recesses where they abut to the body or web, in combination with wedges or keys driven into said recesses, substantially as herein described.

In witness whereof I have hereunto set my hand.

PETER H. JACKSON.

Witnesses:
C. D. COLE,
J. H. BLOOD.